US008264329B2

(12) United States Patent
(10) Patent No.: US 8,264,329 B2

Roberts et al.

(45) Date of Patent: Sep. 11, 2012

(54) METHOD AND SYSTEM FOR ROOM ACTIVITY COMMUNICATION

(75) Inventors: Stuart J. Roberts, Suffern, NY (US); John Demetrops, Stony Point, NY (US); Vladimir Schuster, New City, NY (US)

(73) Assignee: Monismart Systems, LLC, Stony Point, NY (US)

( * ) Notice: Subject to any disclaimer, the term of this patent is extended or adjusted under 35 U.S.C. 154(b) by 939 days.

(21) Appl. No.: 12/334,686

(22) Filed: Dec. 15, 2008

(65) Prior Publication Data

US 2010/0148919 A1 Jun. 17, 2010

Related U.S. Application Data

(63) Continuation-in-part of application No. 11/973,226, filed on Oct. 5, 2007, now Pat. No. 7,474,210, which is a continuation-in-part of application No. 11/340,962, filed on Jan. 26, 2006, now Pat. No. 7,489,239, which is a continuation of application No. 10/340,272, filed on Jan. 10, 2003, now Pat. No. 7,075,432.

(51) Int. Cl.
*H04Q 5/22* (2006.01)

(52) U.S. Cl. ..................... 340/10.1; 340/5.2; 340/572.1; 340/568.1; 235/385

(58) Field of Classification Search .... 340/572.1–572.8, 340/10.1, 5.2, 568.1; 235/385
See application file for complete search history.

(56) References Cited

U.S. PATENT DOCUMENTS

| | | | | |
|---|---|---|---|---|
| 3,739,329 | A | 6/1973 | Lester | |
| 3,906,447 | A * | 9/1975 | Crafton | 235/382.5 |
| 4,157,534 | A * | 6/1979 | Schachter | 340/5.23 |
| 4,598,275 | A | 7/1986 | Ross et al. | |
| 4,636,950 | A | 1/1987 | Caswell et al. | |
| 5,397,884 | A | 3/1995 | Saliga | |

(Continued)

OTHER PUBLICATIONS

Mitchell, Robert, "Its Just the Key to Your Room", http/www/computerworld.com/securitytopics/security/story/0,10801,107701,00.html (Jan. 16, 2006).

*Primary Examiner* — Eric M Blount
(74) *Attorney, Agent, or Firm* — Porzio, Bromberg & Newman, P.C.

(57) ABSTRACT

The invention relates to a method and system for room activity communication. In one embodiment, a tray sensing device detects the presence of a tray in a given location and forwards the information to a room controller. The tray can be a conventional tray for supporting food articles or can be supported or integral with a food cart. The system also includes a door lock/tag controller for monitoring door lock and door tag information. Information from the tray sensing device, door lock/tag controller is communicated to a room controller. The room controller of each room can include a wireless network to the tray controller and/or door lock/tag controller. The room controller can also monitor information of the room such as, for example, temperature, humidity and light intensity information, and receive information regarding room activities, such as, for example, room service ordering and status, housekeeping, minibar, phone messages and checkout routine. Information from the room controller can be forwarded to a central host controller for management of the information. The central host controller can display the information, activate an alarm or separate and send data to relevant controllers located, for example at security, service, housekeeping and front desk. The alarm can be an audio or visual alert. The alarm can be deactivated upon removal of the tray from the given location or acknowledgement of request.

30 Claims, 4 Drawing Sheets

U.S. PATENT DOCUMENTS

| | | | |
|---|---|---|---|
| 5,614,703 | A | 3/1997 | Martin et al. |
| 5,708,423 | A | 1/1998 | Ghaffari et al. |
| 5,802,147 | A | 9/1998 | Beyda et al. |
| 6,064,316 | A | 5/2000 | Glick et al. |
| 6,102,162 | A | 8/2000 | Teicher |
| 6,107,929 | A | 8/2000 | Amari |
| 6,152,321 | A | 11/2000 | Staar |
| 6,351,215 | B2 | 2/2002 | Rodgers et al. |
| 6,433,689 | B1 | 8/2002 | Hovind et al. |
| 6,437,692 | B1 | 8/2002 | Petite et al. |
| 6,577,238 | B1 | 6/2003 | Whitesmith et al. |
| 6,714,121 | B1 | 3/2004 | Moore |
| 7,049,933 | B1 | 5/2006 | Koerner |
| 7,061,393 | B2 | 6/2006 | Buckingham et al. |
| 7,075,432 | B2 | 7/2006 | Roberts et al. |
| 7,084,740 | B2 | 8/2006 | Bridgelall |
| 7,170,407 | B2 * | 1/2007 | Wagner .................... 340/539.13 |
| 7,296,448 | B1 | 11/2007 | Shaw |
| 7,446,644 | B2 | 11/2008 | Schaffzin et al. |
| 7,474,210 | B2 | 1/2009 | Roberts et al. |
| 7,489,239 | B2 | 2/2009 | Roberts et al. |
| 7,492,248 | B1 | 2/2009 | Bjorkland et al. |
| 7,536,034 | B2 | 5/2009 | Rhoads et al. |
| 2004/0003257 | A1 | 1/2004 | Mitchell |
| 2004/0046018 | A1 | 3/2004 | Dobbins |
| 2005/0035862 | A1 | 2/2005 | Wildman et al. |
| 2005/0150952 | A1 | 7/2005 | Chung |
| 2006/0049268 | A1 | 3/2006 | Weimer et al. |
| 2006/0226988 | A1 | 10/2006 | Ernst et al. |
| 2006/0252524 | A1 * | 11/2006 | Friesen et al. .................. 463/29 |
| 2006/0290471 | A1 | 12/2006 | Van Alstyne |
| 2007/0004518 | A1 | 1/2007 | Friesen et al. |
| 2007/0018787 | A1 | 1/2007 | Martinez de Velasco Cortina et al. |
| 2008/0103939 | A1 | 5/2008 | Gibb |
| 2008/0117045 | A1 | 5/2008 | Roberts et al. |
| 2008/0290990 | A1 | 11/2008 | Schaffzin et al. |

* cited by examiner

METHOD AND SYSTEM FOR ROOM ACTIVITY COMMUNICATION

CROSS-REFERENCE TO RELATED APPLICATION

This application is a continuation-in-part of U.S. patent application Ser. No. 11/973,226, filed Oct. 5, 2007 now U.S. Pat. No. 7,474,210, which is a continuation-in-part U.S. patent application Ser. No. 11/340,962 filed Jan. 26, 2006 now U.S. Pat. No. 7,489,239, which is a continuation of U.S. patent application Ser. No. 10/340,272 filed Jan. 10, 2003 now U.S. Pat. No. 7,075,432, all of which are hereby incorporated by reference in their entirety into this application.

BACKGROUND OF THE INVENTION

1. Field of the Invention

The present invention relates to a method and system for monitoring, communicating and managing of room activity including monitoring food tray activity in which the system detects the presence or absence of a food tray in a hallway of a multiple unit building, such as in a hotel or motel, and monitoring of door lock, door tag and room information. (i.e., Temperature, humidity, light info, Minibar status etc.) and communicating the food tray activity, door lock/door tag and room information to a central location for management of the room information.

2. Background of the Invention

Typically, food is delivered on trays to patrons in rooms of hotels by room service. Conventionally, after the patron has finished the food, the tray holding the used dishes and any uneaten food is placed in the hallway. Thereafter, the tray is picked up at some point by housekeeping or room service. The disadvantage of this method is that housekeeping or room service are unaware when the patron has finished the meal and do not know when to pick up the tray from outside the patron's room. Accordingly, it can be several hours before the tray is picked up resulting in unsightly trays being in the hallways and observed by other patrons of the hotel, as well as uneaten food having the possibility of spoiling and drawing pests or rodents.

Conventional electronic door locks used in a hotel typically are stand alone devices. Each door lock contains a sequence of lock codes. The sequence advances when an expired card is swiped or a new card is inserted. The lock can log when a guest, maid or other hotel employee has entered the room. Conventional hotel door locks are not wired to the systems at the front desk. Therefore, if a card is lost and a new card is issued, the room remains unprotected until the new card is inserted into the lock and it resets.

U.S. Pat. No. 5,614,703 describes a method and apparatus for a guest having a valid general purpose credit card to register at a place of lodging having a computer, and which uses the general purpose credit card as a key to the assigned room. The method involves the inserting of a general purpose credit card into a card reader of a guest accessible registration terminal, the card reader reading the credit card information and delivering the information to a computer. The computer stores the card information, and the terminal, by means of registration software obtains further information from the guest, assigns the guest a room, and informs the guest of the room assignment, after which the credit card becomes a key to the guest room. When the credit card is inserted in the proper card reader at the assigned guest room door, the computer will actuate the lock and allow the guest access. A paging transmitter forwards information wirelessly from the computer to a paging receiver electrically connected to the card reader of the assigned room.

It is desirable to provide a room information system for monitoring food tray activity, lock status, door tag, room information and temperature of the thermostat wherein such system can alert a central location.

SUMMARY OF THE INVENTION

The invention relates to a method and system for room activity communication. In one embodiment, a tray sensing device detects the presence of a tray in a given location and forwards the information to a room controller. The tray can be a conventional tray for supporting food articles or can be supported or integral with a food cart. The system also includes a door lock/tag controller for communicating door lock and door tag information. Information from the tray sensing device, door lock/tag controller is communicated to a room controller. The room controller of each room can include a wireless network to the tray controller and/or door lock/tag controller. The room controller can also monitor information of the room such as, for example, temperature, humidity and light intensity information, and receive information regarding room activities, such as, for example, room service ordering and status, housekeeping, minibar and checkout routine. Information from the room controller can be forwarded to a central host controller for management of the information. The central host controller can display the information, activate an alarm or separate and send data to relevant controllers located, for example at security, service, housekeeping and front desk. The alarm can be an audio or visual alert. The alarm can be deactivated upon removal of the tray from the given location or acknowledgement of request. The door lock can be activated by conventional magnetic cards as well as RFID or any other type of electronic cards. The door lock/tag controller of the present invention can be used with existing door locks and readers of electronic cards and the information received at the door lock/tag controller can be communicated to a room controller which communicates with a central location to validate and authorize access to the room or to manage room information. Accordingly, the multiple unit building, such as a hotel, can use existing door locks and is not required to change the door locks in order to receive benefits from central communication of lock and card information, thereby providing low manufacturing costs.

The invention will be more fully described by reference to the following drawings.

DETAILED DESCRIPTION

Figure 1:
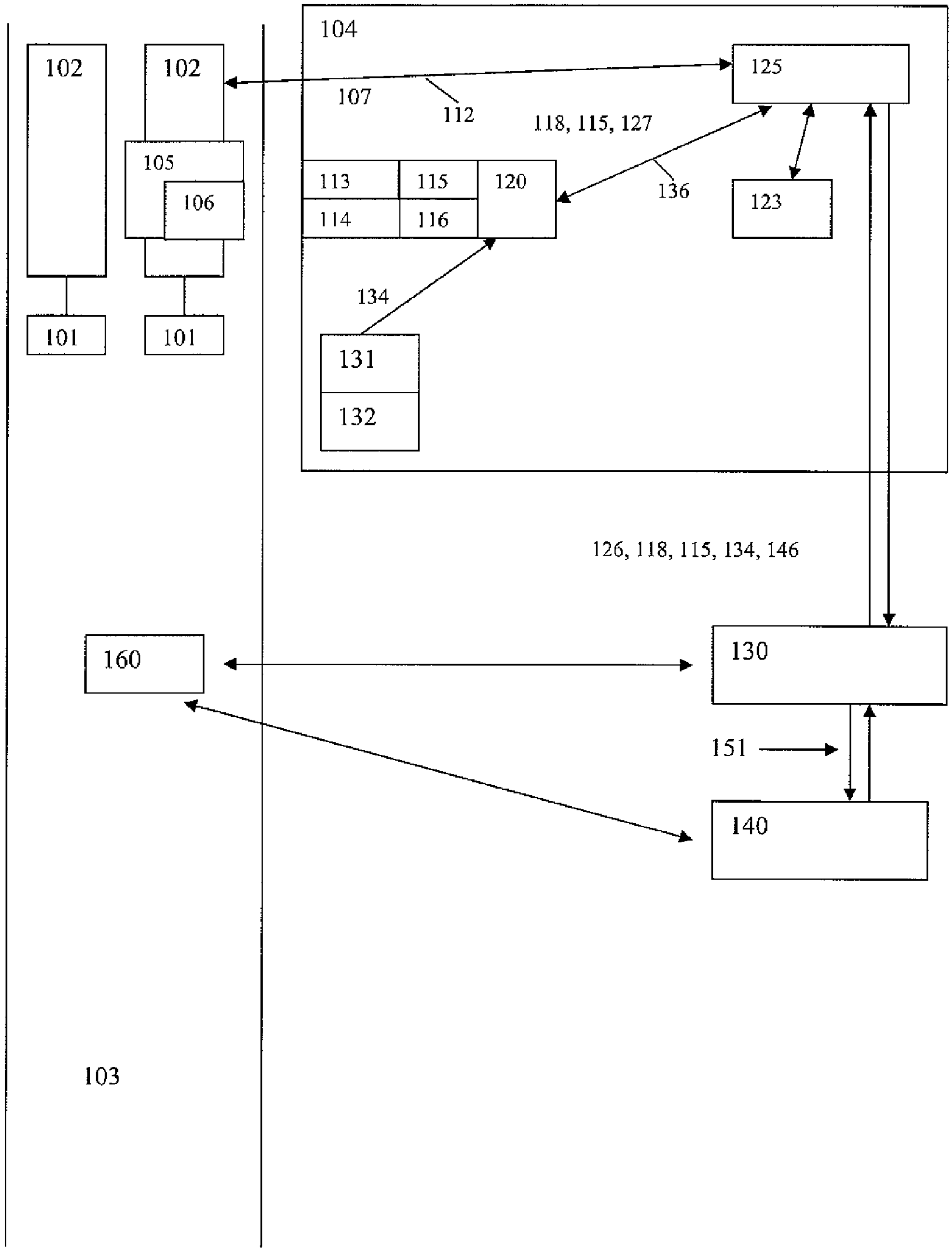
FIG. 1 is a schematic diagram of a system for monitoring tray, lock and door tag activity in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts. Like reference numerals will be used in figures of the invention.

FIG. 1 is a schematic diagram of room information communication system 100 in accordance with the teachings of the present invention. Tray sensing device 101 is positioned in hallway 103. In one embodiment tray sensing device 101 comprises floor antennas 102. For example, floor antenna 102 can be a flat ribbon cable. Floor antenna 102 can be positioned underneath floor covering in hallway 103. Alternatively, antenna 102 can be positioned on the top surface of hallway 103 or integral with hallway 103.

In one embodiment tray RFID device 106 is coupled to food tray 105. For example, tray RFID device 106 can be a resonant device, which is read by floor antenna 102. In an alternate embodiment, tray sensing device 101 and tray RFID device 106 can be a transmitter or receiver for respectively sending or receiving a signal for determining the presence or absence of food tray 105 within a predetermined distance from tray sensing device 101. In this embodiment, the transmitter and receiver can communicate over a wireless or wired connection. It will be appreciated by those skilled in the art that other implementations of a tray sensor and tray sensing device can be used with the teachings of the present invention. Room 104 can be in a multiple unit building, such as a hotel, motel or apartment building.

Floor antennas 102 are located in hallway 103 in front of room 104. Floor antenna 102 senses the presence of food tray 105. Floor antenna 102 detects tray information 107 of the presence of food tray 105. Tray sensing device 101 forwards tray information 107 about the presence of food tray 105 to room controller 125 over communication path 112. Room controller 125 associates a room address with tray information 107. Room controller 125 forwards this information to central controller 130 over connection 126.

Lock 113 is associated with room 104 and mounted on door 111. Lock 113 can be a conventional electronic lock operated by door lock card 114. For example, an electronic lock system manufactured by ONITY, INC. or Assa Abloy can be used with the teachings of the present invention. Door lock/tag controller 120 monitors activity of door lock card 114. Each time lock 113 is deactivated by door lock card 114 door lock/tag controller 120 sends lock identification 118 of lock 113 and card entry code 115 to room controller 125 over connection 136. Room controller 125 forwards lock identification 118 and card entry code 115 to central controller 130 over connection 126. Central controller 130 can store lock identification 118 and card entry code 115 in memory at central controller 130. Processing at central controller 130 can authorize and validate lock identification 118 and card entry code 115. Accordingly, system 100 archives each access event to a room into memory with time and date stamp. This information can be used by security or management and can be transferred to service host controller 140.

In the case in which lock 113 is not deactivated by door lock card 114, door lock/tag controller 120 sends lock identification 118 of lock 113 and card entry code 115 to room controller 125. Room controller 125 associates a room address with lock identification 118 and card entry code 115. Room controller 125 forwards lock identification 118 of lock 113 and card entry code 115 to central controller 130 which can be transferred to service host controller 140 to notify a security service.

Conventional systems currently work such that when door lock card 114 is issued it has a unique entry code for the particular room 104. In the present invention, when a new door lock card 114 is issued the unique information from that particular door lock card 114 is encoded and with lock identification 118 forwarded from service host controller 140 via central controller 130 and room controller 125 to door lock/tag controller 120.

Lock 113 can be powered by battery 116. Door lock/tag controller 120 monitors power of battery 116. Door lock/tag controller 120 sends alert 127 to room controller 125 when power is below a certain voltage threshold, for example, less than 3.9 volts.

Door tag 131 can be associated with different service requests (for example “Do not disturb”, “Breakfast Request”, “Make Up Room” etc.). Door tag 131 includes an associated RFID tag 132. Door lock/tag controller 120 monitors door tag 131 and received door tag information 134. Door tag information 134 of RFID tag 132 can be forwarded to room controller 125 over connection 136. Room controller 125 forwards door tag information 134 to central controller 130 for immediate processing of door tag information 134.

Figure 2:
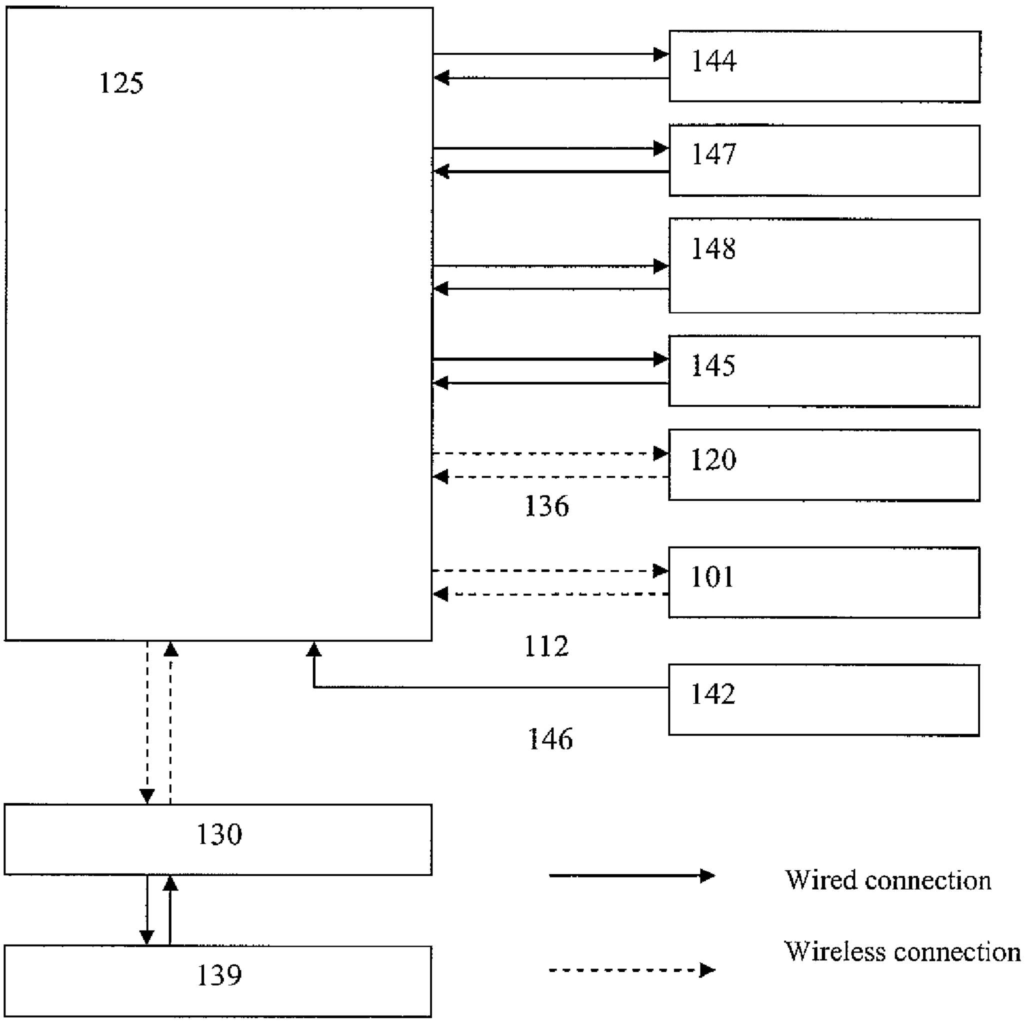
FIG. 2 is a schematic diagram of an embodiment of a room controller.

Room controller 125 is a separate device that can activate and monitor different parameters in room, as shown in FIG. 2. Room controller 125 can be powered by 110 volts and can be plugged in anywhere in room 104. Room controller 125 can include screen display 139 and navigation device 142 to scroll through a menu of services and options. Room controller 125 can have a plurality of connections, wire or wireless connections to sensors and controllers in order to process room information from the various devices and to forward the information from each to central controller 130 for processing and distribution to the relevant services host controllers 140. Room controller 125 can communicate with thermostat 123 provided anywhere in room 104. Room controller 125 can activate thermostat 123 for raising or lowering the temperature. Room controller 125 can include sensor 144 to transmit room temperature information. Room controller 125 can include sensor 145 to transmit room light intensity. Room controller 125 can include sensor 147 to transmit room humidity information. Room controller 125 can include sensor 148 to transmit mini bar information. Room controller 125 can include sensor 149 to transmit shade control information. It will be appreciated that room controller 125 can receive information for any conventional and other wireless devices to monitor room conditions or room activities. Navigation device 142 can be used to input room information 146 at room controller 125. For example, room information 146 can include information on room service ordering, housekeeping, minibar, and check out routine. In one embodiment, navigation device 142 can be used to scroll through a phone message log. Messages from a hotel phone operator delivered to room controller 125 can be reviewed and deleted using navigation device 142.

Central controller 130 can be used to control a plurality of room controllers 125 for providing a desired room condition. For example, central controller 130 can communicate with a plurality of room controllers on a particular floor of a multiple unit building for raising or lowering the temperature in each of the rooms of the particular floor, wing or section.

Connections 112, 126 and 136 can be wired or wireless connection, as shown in FIG. 1. As described above, room controller 125 receives tray information 107 from tray sensing device 101; lock identification 118, card entry code 115 and door tag information 134 from door lock/tag controller 120 which information can be received over a wireless connection.

For example, central controller 130 can be connected with wireless connection 126 to room controller 125. It will be appreciated that a predetermined number of rooms can be connected to central controller 130. Central controller 130 can be located, for example at the front desk or hotel manager's office. Central controller 130 can forward tray information 107, lock identification 118, card entry code 115, room information 146 and door tag information 134 to one or more service host controllers 140. Service host controllers 140 can be located at service areas of the hotel, for example, at room service, housekeeping, concierge, front desk, security, and the like. Service host controllers 140 use tray information 107, lock identification 118, card entry code 115, door tag information 134 and room information 146 for performing tasks. Once tasks are accomplished, service host controller 140 send confirmation information 151 to central controller 130. Central controller 130 forwards confirmation information 151 to room controller 125.

Referring to FIG. 1, in one embodiment, room information communication system 100 can include service cart controller 160. Service cart controller 160 is a device that can receive and forward information from a location which is remote to room 104. For example, service cart controller 160 can be a wireless device coupled to a maid cart. Service cart controller 160 can communicate with central controller 130 and/or service host controller 140 and/or door lock/tag controller 120. In one embodiment, once door tag 131 has been hung or room information is inputted at room controller 125, received door tag information 134 and/or room information 146 received by room controller 125 is forwarded by central controller 130 to service host controller 140. For example, service host controller 140 can be located in housekeeping. Service host controller 140 sends message information 162 to one or more of service cart controllers 160 to notify them of a task to be addressed. For example, message information 162 can be to make up a particular room, i.e., Room 111. After the task to be addressed is completed, task message information 164 is sent from service cart controller 160 to one or more of service host controller 140. For example, task message information 164 can include information on completion of the task, i.e., Room 111 has been made up. Task message information 164 can be forwarded to central controller 130 for storing task message information 164 in an archive. The archive can include task message information 164, such as room number, type of task completed, employee identification of person who completed the task, and a time and date stamp.

Figure 3:
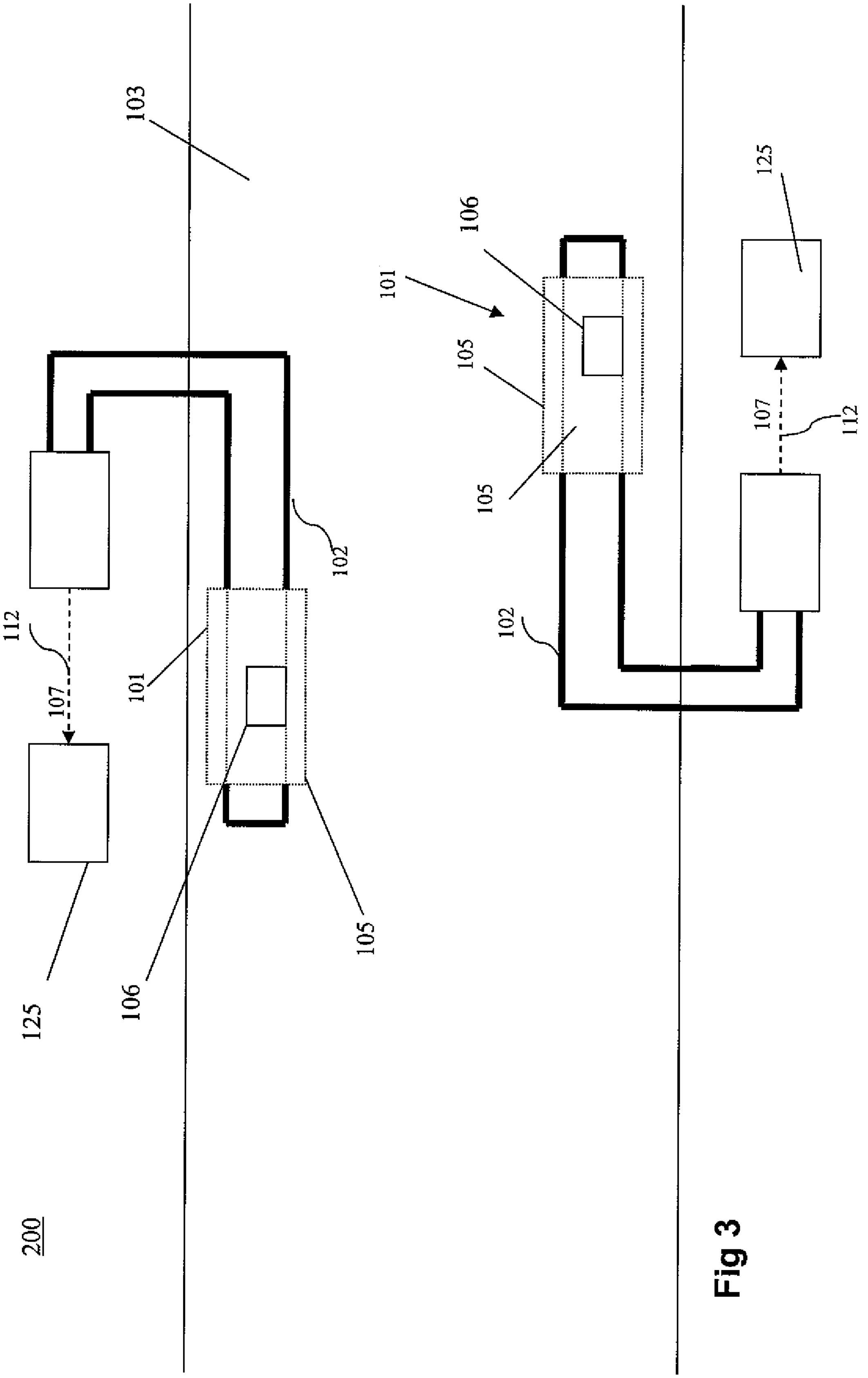
FIG. 3 is a schematic diagram of a plurality of tray sensor devices associated with a hallway.

FIG. 3 illustrates an embodiment of a plurality of tray controllers positioned along a hallway which can be used in room information system 200. Tray sensing device 101 includes antenna 102. For example, antenna 102 can be a flat ribbon cable. Antenna 102 can be positioned underneath floor covering in hallway 103. Alternatively, antenna 102 can be positioned on the top surface of hallway 103 or integral with hallway 103

Tray RFID device 106 is coupled to surface 110 of food tray 105. For example, tray RFID device 106 can be a resonant device which is read by antenna 102. In an alternate embodiment, tray sensing device 101 can be a transmitter or receiver for respectively sending or receiving a signal for determining the presence or absence of food tray 105 within a predetermined distance from tray sensing device 101. In this embodiment, the transmitter and receiver can communicate over a wireless or wired connection. It will be appreciated by those skilled in the art that other implementations of a tray sensor and tray sensing device can be used with the teachings of the present invention.

Upon sensing food tray 105, tray sensing device 101 forwards tray information 107 to room controller 125 over communication path 112. Tray information 107 can be generated at tray sensing device 101 to provide information about the room 104 location of food tray 105 along hallway 103. Communication path 112 can be a wired or wireless connection.

Figure 4:
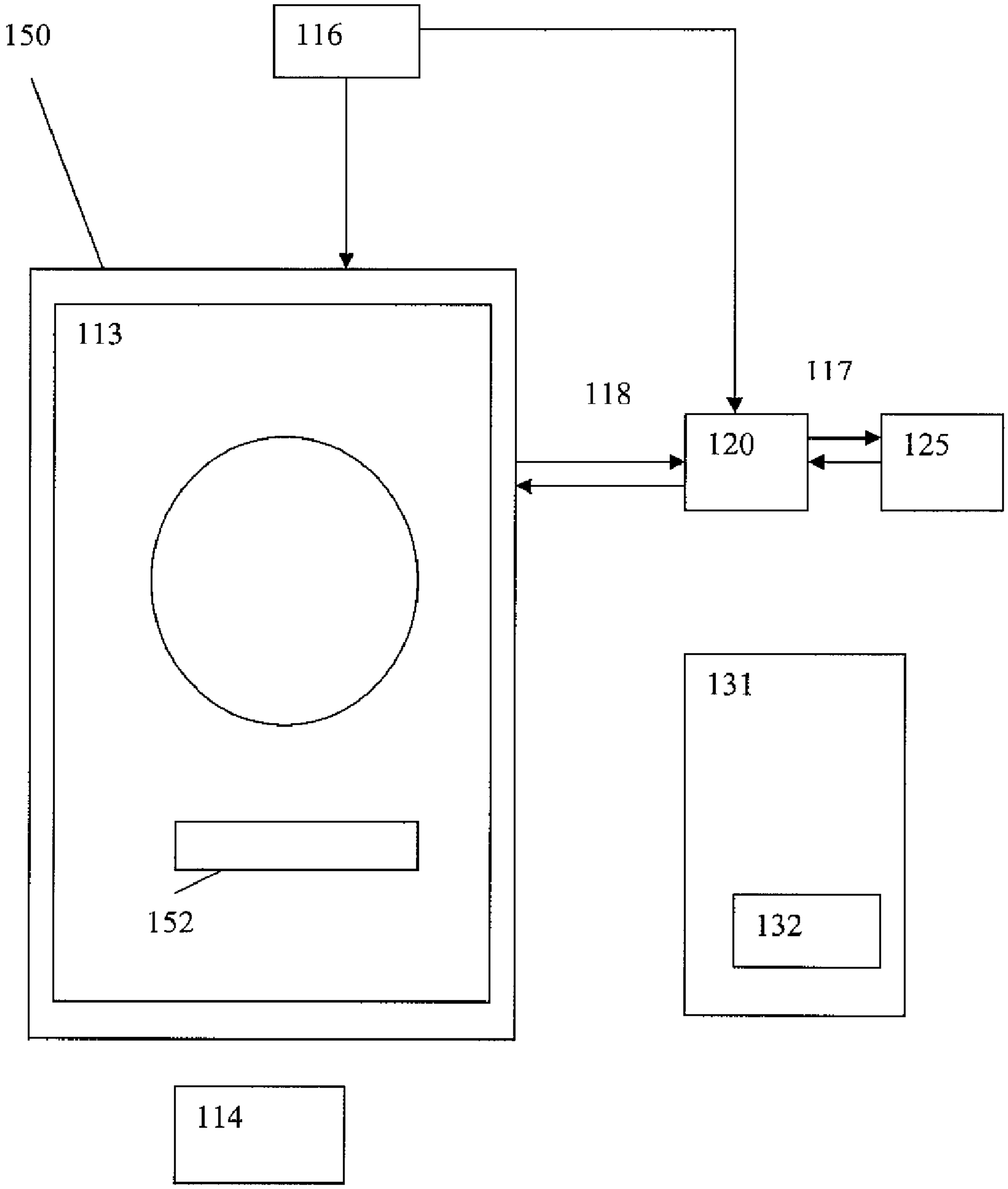
FIG. 4 is a schematic diagram of a lock and door lock/tag controller.

FIG. 4 is a schematic diagram of a lock 113 and door lock/tag controller 120. Lock 113 is fitted with lock antenna 150 which surrounds lock 113. Lock 113 can be a conventional lock. Door lock card 114 can be inserted in slot 152. Alternatively, door lock card 114 can be an RFID card which can be presented in the direction of lock 113 and read by lock antenna 150. Lock antenna 150 reads information from RFID tag 132 which is attached to the back of door tag 131. Door tag 131 can be a conventional door tag which can be inserted into a slot in lock 113 or received around a handle of lock 113. Door lock/tag controller 120 receives lock identification and door information 134 from lock antenna 150 and then forwards the information to room controller 125 for further processing and review to the central controller 130. If necessary central controller 130 sends information to relevant service controllers 140.

The major benefit of this system is that it enables hotels to use their existing systems for lock and door tag information. The system works within the current limitations and benefits current activities while utilizing the information and processing it to provide faster and better services to the hotel customer while reducing labor costs for the hotel.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method for room activity communication comprising the steps of:

a door lock/tag controller receiving door lock information from a door lock or determining door lock information from said door lock or an RFID card;

optionally providing a door tag, said door tag including an associated RFID tag, said RFID tag adapted for communicating door tag information of said RFID tag to said door lock/tag controller;

receiving one or more of said door lock information from said door lock/tag controller and said door tag information from said door lock/tag controller at a room controller, and associating a room address with said door lock information and/or said door tag information;

forwarding said associated room address, said door lock information and/or said door tag information from said room controller to a central information system;

managing said door lock information and/or said door tag information at said central information system;

communicating information from said central information system to said room controller; and communicating said information received at said room controller to said door lock/tag controller.

2. The method for room activity communication of claim 1 wherein said door lock is activated by a door lock card, said door lock card providing said door lock information.

3. The method of claim 2 wherein said door lock card includes a unique card entry code.

4. The method of claim 1 further comprising the steps of:

providing a tray sensing device for sensing a tray in a vicinity of the tray sensing device, said tray sensing device adapted for communicating tray information of the presence of a tray to a tray controller, said room controller receiving said tray information from said tray information associating a room address with said tray information and forwarding said tray information from said room controller to a central information system, said central information system managing said tray information and communicating information from said central information system to said room controller.

5. The method of claim 1 further comprising the step of storing said door lock information received at said central information system in memory of said central information system.

6. The method of claim 1 further comprising the steps of determining if said door lock card deactivated said door lock;

if said door lock card did not deactivate said door lock, forwarding from said door lock/tag controller an identification of said door lock and said card entry code to said room controller;

forwarding said identification of said door lock and said card entry code to said central information system;

determining if said identification of said door lock and said card entry code are correct, if said identification of said door lock and said card entry code are correct, forwarding lock activation information from said central information system to said room controller; said lock activation information being used to activate said door lock.

7. The method of claim 6 further comprising the step of monitoring power of a battery of said door lock with said door lock/tag controller; and if said power is below a threshold, forwarding an alert from said door lock/tag controller to said room controller.

8. The method of claim 1 further comprising the steps of:

sensing room temperature information with said room controller; and forwarding said room temperature information from said room controller to said central information system.

9. The method of claim 1 further comprising the steps of:

sensing room light intensity information with said room controller; and forwarding said room light intensity information from said room controller to said central information system.

10. The method of claim 1 further comprising the steps of:

navigating a screen display of said room controller for inputting room information at said room controller; and forwarding said room information to said central information system.

11. The method of claim 10 wherein said screen display comprises one or more phone message.

12. The method of claim 1 further comprising the step of:

forwarding door tag information and/or room information to a service cart controller.

13. The method of claim 12 further comprising the step of:

forwarding task message information from said service cart controller to said central information system.

14. The method of claim 13 further comprising the step of:

storing said task message information received at said central information in memory of said central information system.

15. The method of claim 14 wherein the task message information includes one or more of room number, type of task completed, employee identification of person who completed the task, and a time and date stamp.

16. The method of claim 1 further comprising the step of:

monitoring a thermostat with said room controller;

forwarding thermostat information from said room controller to said central information system; and forwarding thermostat information to one or more of said room controllers from said central information system for controlling the thermostat in said respective said one or more room controllers.

17. A system for room activity communication comprising:

a door lock/tag controller receiving door lock information from a door lock or determining door lock information from said door lock or an RFID card;

a door tag, said door tag including an associated RFID tag, said RFID tag adapted for communicating door tag information of said RFID tag to said door lock/tag controller;

a room controller receiving one or more of said door lock information from said door lock/tag controller and said door tag information from said door lock/tag controller at, and associating a room address with said door lock information and/or said door tag information;

means for forwarding said associated room address, said door lock information and/or said door tag information from said room controller to a central information system;

means for managing said door lock information and/or said door tag information at said central information system;

means for communicating information from said central information system to said room controller; and communicating said information received at said room controller to said door lock/tag controller.

18. The system for room activity communication of claim 17 wherein said door lock is activated by a door lock card, said door lock card providing said door lock information.

19. The system of claim 18 wherein said door lock card includes a unique card entry code.

20. The system of claim 17 further comprising:

a tray sensing device for sensing a tray in a vicinity of the tray sensing device, said tray sensing device adapted for communicating tray information of the presence of a tray to a tray controller;

said room controller receiving said tray information from said tray information associating a room address with said tray information and forwarding said tray information from said room controller to said central information system, said central information system managing said tray information and communicating information from said central information system to said room controller.

21. The system of claim 17 further comprising means for storing said door lock information received at said central information system in memory of said central information system.

22. The system of claim 17 further comprising:

means for sensing room temperature information with said room controller; and means for forwarding said room temperature information from said room controller to said central information system.

23. The system of claim 17 further comprising:

means for sensing room light intensity information with said room controller; and means for forwarding said room light intensity information from said room controller to said central information system.

24. The system of claim 17 further comprising:

means for navigating a screen display of said room controller for inputting room information at said room controller; and means for forwarding said room information to said central information system.

25. The method of claim 24 wherein said screen display comprises one or more phone message.

26. The system of claim 17 further comprising:

means for forwarding door tag information and/or room information to a service cart controller.

27. The system of claim 26 further comprising:

means for forwarding task message information from said service cart controller to said central information system.

28. The system of claim 27 further comprising:

means for storing said task message information received at said central information in memory of said central information system.

29. The system of claim 28 wherein the task message information includes one or more of room number, type of task completed, employee identification of person who completed the task, and a time and date stamp.

30. The system of claim 17 further comprising:

means for monitoring a thermostat with said room controller;

means for forwarding thermostat information from said room controller to said central information system; and means for forwarding thermostat information to one or more of said room controllers from said central information system for controlling the thermostat in said respective said one or more room controllers.

* * * * *